United States Patent [19]

Nahon

[11] 3,872,324
[45] Mar. 18, 1975

[54] LOGIC SYSTEM FOR SEQUENTIALLY TESTING THE STATES OF A SYSTEM OF CONTACTS

[75] Inventor: Poland Nahon, Paris, France

[73] Assignee: Jeumont-Schneider, Paris (Seine), France

[22] Filed: June 14, 1974

[21] Appl. No.: 479,475

Related U.S. Application Data

[63] Continuation of Ser. No. 300,328, Oct. 24, 1972, abandoned.

[30] Foreign Application Priority Data

Oct. 21, 1971  France .............................. 71.37793

[52] U.S. Cl. ................. 307/241, 307/218, 307/253, 317/137, 324/28 R, 340/166 R, 179/18
[51] Int. Cl. ....................... H03k 17/00, G01r 31/02
[58] Field of Search ........... 307/203, 218, 239, 241, 307/253; 317/137, 139; 324/28 R, 51; 178/69; 179/18, 175; 340/166 R

[56] References Cited
UNITED STATES PATENTS

| | | | |
|---|---|---|---|
| 2,902,642 | 9/1959 | Voegtlen .......................... | 324/28 R |
| 2,997,646 | 8/1961 | Voegtlen .......................... | 324/28 R |
| 3,253,214 | 5/1966 | Heilweil et al. ................... | 324/28 R |
| 3,363,064 | 1/1968 | Sperlich ............................. | 179/18 |

*Primary Examiner*—Stanley D. Miller, Jr.
*Attorney, Agent, or Firm*—Raymond A. Robic; Arthur Schwartz; David A. Blumenthal

[57] ABSTRACT

A logic system for sequentially testing the states of a system of contacts: It is characterized in that it comprises: $2^{n+p}$ contacts to be tested, $n$ and $p$ being integers greater than 1, the contacts being tested by groups of $2^m$ contacts, $m$ being an integer less than $n$; a diode matrix comprising $2^n$ columns and $2^p$ rows wherein each diode is in series with one of the contacts to be tested, each column is embodied by a bus bar having one end connected via a load resistance to one pole of a battery whose other pole is earthed, and each row is earthed via a switching transistor called a "row transistor"; $2^m$ contact position reading circuits each comprising a diode logic or-circuit having $2^{n-m}$ inputs, each of the $2^n$ bus bars being connected to just one of the latter inputs, the output of each logic or-circuit being connected via two diodes in series to the base of a transistor called "reading transistor" whose emitter is earthed and whose collector is connected to an amplifier for detecting whether the reading transistor is in the conductive or non-conductive state, each such state corresponding to one of the positions of the tested contact; and an address counter having $2^{n+p-m}$ addresses which are decoded through the agency of the matrix and of a selector circuit comprising diode logic or-circuits having their outputs earthed via a switching transistor called "selecting transistor" and their inputs connected to the bus bars, so that during the decoding of an address the selecting circuit earths every input but one of each reading circuit and only one of the row transistors is in the conductive state.

1 Claim, 1 Drawing Figure

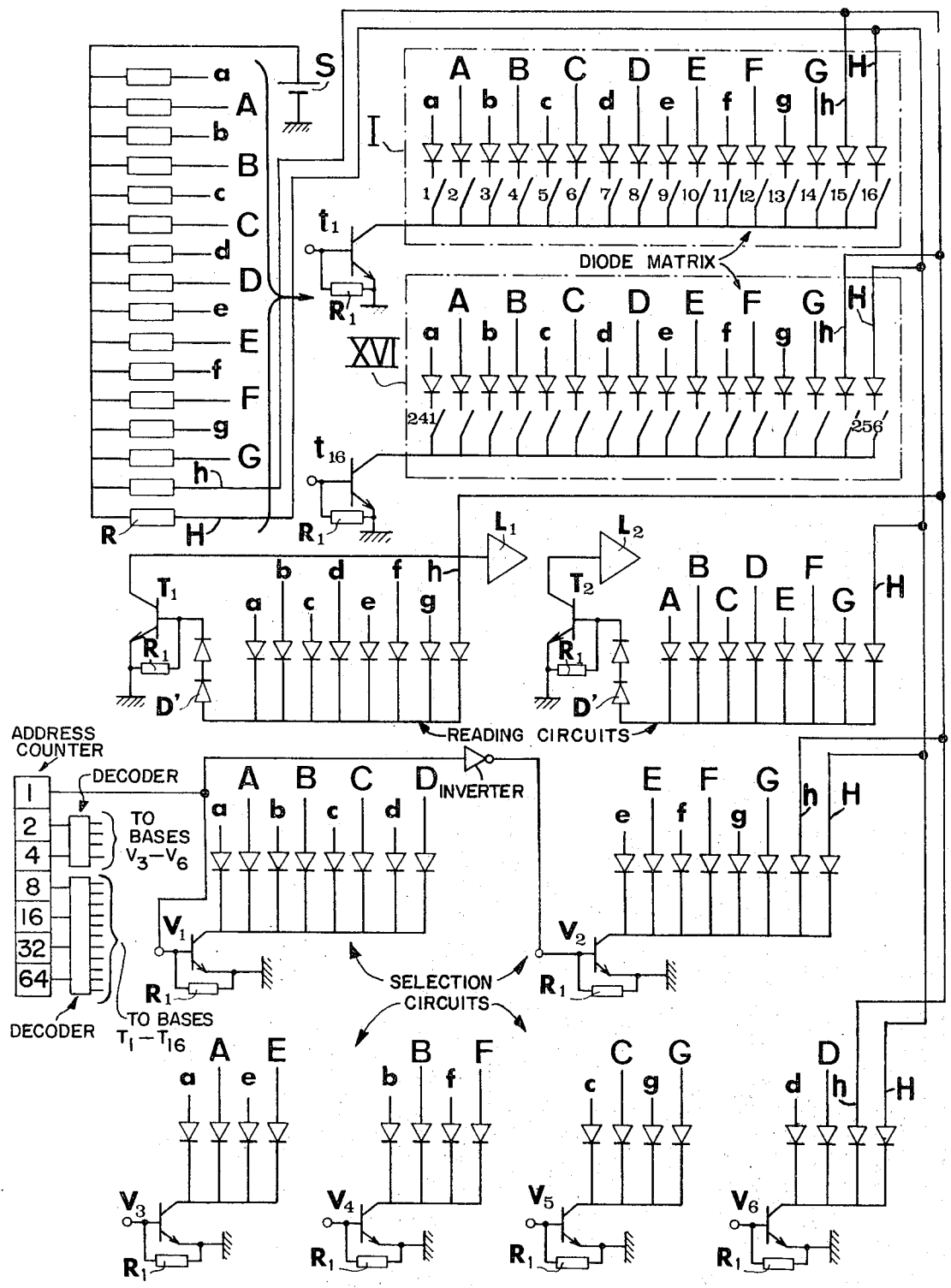

LOGIC SYSTEM FOR SEQUENTIALLY TESTING THE STATES OF A SYSTEM OF CONTACTS

This is a continuation, of application Ser. No. 300,328, filed Oct. 24, 1972, now abandoned.

This invention relates to a logic system for sequentially testing the states or positions of a system of contacts, e.g. relay contacts.

Testing systems of this kind are known, but most of the known systems have the disadvantage of not being able to provide simultaneous testing of the position of more than one contact, unless a great number of components is used.

This invention obviates this disadvantage and enables a number of contacts to be thus tested at relatively low cost.

The system according to the invention is characterized in that it comprises:

$2^{n+p}$ contacts to be tested, $n$ and $p$ being integers greater than 1, the contacts being tested by groups of $2^m$ contacts, $m$ being an integer less than $n$;

a diode matrix comprising $2^n$ columns and $2^p$ rows wherein each diode is in series with one of the contacts to be tested, each column is embodied by a bus bar having one end connected via a load resistance to one pole of a battery whose other pole is grounded, and each row is grounded via a switching transistor called a row transistor;

$2^m$ contact position reading circuits each comprising a diode logic or-circuit having $2^{n-m}$ inputs, each of the $2^n$ bus bars being connected to just one of the latter inputs, the output of each or-element being connected via two diodes in series to the base of a transistor called reading transistor whose emitter is earthed and whose collector is connected to an amplifier for detecting whether the reading transistor is in the conductive or non-conductive state, each such state corresponding to one of the positions of the tested contact, and an address counter having $2^{n+p-m}$ addresses which are decoded through the agency of the matrix and of a selector circuit comprising diode logic or-circuits having their outputs earthed via a switching transistor called selecting transistor and their inputs connected to the bus bars, so that during the decoding of an address the selecting circuit earths every input but one of each reading circuit and only one of the row transistors is in the conductive state.

The invention will be more clearly understood with the help of an embodiment and of the single accompanying, representing the circuit diagram of a logic system for testing the states — i.e., whether they are closed or open — of a group of 256 relay contacts numbered from 1 to 256 and grouped in 16 groups having the Roman numeral references I to XVI, each group comprising sixteen each contact in series with one diode. All that the single FIGURE shows is the first group I and the last group XVI each surrounded by chain-dotted line framing, so as not to make the diagram unnessarily complicated.

In the example chosen, $n = 4$, $p = 4$. The diode matrix, in which each diode is in series via its cathode with one of the contacts whose open or closed state it is required to determine, comprises 16 rows and 16 columns. Each row is connected to the collector of an NPN transistor called a row transistor $t$ (whose index represents the row rank), the transistor emitter being grounded. The 16 row transistors act as switches, according to the kind of signal applied to their base.

The 16 matrix columns are embodied by 16 bus bars (not shown in order not to overload the diagram) but indicated by the letters aA bB cC dD eE fF gG hH. The bus bars have one end connected to the matrix diode anodes and the other end connected to the positive pole of a DC supply S via a load resistance R.

The contacts are tested in groups of two, $m$ being equal to unity. There are two reading circuits each comprising a diode logic or-circuit whose inputs (which are the diode anodes) are respectively connected to the bus bars having lower-case references in the case of the first logic or-circuit and to the bus bars having upper-case references in the case of the second logic or-circuit. By way of two diodes D' in series, the output of each or-element is connected to the base of an NPN transistor $T_1$ or $T_2$ called reading transistor whose emitter is grounded and whose collector is connected to an amplifier $L_1$ or $L_2$ called "reading amplifier".

The selecting circuit comprises the six logic or-circuits at the bottom of the drawing. The first two have eight inputs connected to the bus bars aA bB cC dD and to the bus bars eE fF gG hH. The last four have their inputs connected to bus bars aA eE, bB fF, cC gG, dD hH respectively. The outputs of these six or-elements are connected to the collector of an NPN transistor $V_1$, $V_2$, $V_3$, $V_4$, $V_5$, $V_6$ respectively whose emitter is grounded.

A resistance $R_1$ is connected between the base and the emitter of all the transistors $t$, T and V.

An address counter having 128 addresses is used to test the state of each of the 256 contacts.

The encoding of the addresses is so devised in known manner that for each address the bases of the following transistors are rendered conductive through connection of the transistors to ground:

a single one of the row transistors $t_1$ to $t_{16}$;
one of the transistors $V_1$ or $V_2$; and
all the transistors $V_3$, $V_4$, $V_5$, $V_6$ except one.

Consequently, the entire system shown in the drawing acts as a decoding selector of the 128 addresses. Assuming that the following transistors have been made conductive:

$t_1$ alone of the 16 row transistors;
$V_1$ but not $V_2$;
$V_4$, $V_5$, $V_6$ but not $V_3$;
since transistor $V_1$ is conductive, bars aA bB cC dD are grounded.

Since transistor $V_4$ is conductive, bars bB fF are grounded.

Since transistor $V_5$ is conductive, bars cC gG are grounded.

Since transistor $V_6$ is conductive, bars dD hH are grounded.

Consequently, only bars $e$ and E are not grounded, and a current can flow through them and through the transistor $t_1$. Consequently, the only contacts whose position can be tested are the contacts 9, 10.

If contact 9 is closed, since bar $e$ is grounded via transistor $t_1$, amplifier $L_1$ has no voltage applied to it since the two serially connected diodes D' cut off the transistor $T_1$. If contact 9 is open, bar $e$ is not grounded through transistor $t_1$ but a current flows through the two diodes D' connected to the base of transistor $T_1$. Since the same is conductive, a voltage is applied to reading amplifier $L_1$. Consequently, the open or closed state of contact 9 can be ascertained by means of amplifier $L_1$.

Also, since bar E is not earthed, transistor $T_2$ is either conductive or cut off, for the same reasons as just given, according as contact 10 is open or closed, and the state of contact 10 is indicated by amplifier $L_2$. Consequently, the state of just one definite pair of contacts can be tested by decoding each address. Stepping-on of the address counter changes over the bases of the transistors $t$ and V and enables the other pairs of contacts to be read. The state of the contacts can be cyclically tested either periodically or continuously.

If the number of contacts to be dealt with is other than a power of two, the diode matrix must have a number of intersections equal to the next power of two above the number of contacts, and the number of extra intersections thus used can be considered, for instance, as corresponding to complementary imaginary contacts which are always open.

The embodiment has been dealt with on a positive logic basis, with diode logic circuits and with switching transistors. Transposing the testing system to a negative logic basis or the use of means equivalent to transistors and to the diode circuits falls under the invention.

I claim:

1. A logic circuit for testing the states of an array of contacts comprising:
    a. $2^{n+p}$ contacts to be tested, $n$ and $p$ being integers greater than 1, the contacts being tested by groups of $2^m$, $m$ being an integer less than $n$;
    b. a diode matrix comprising $2^n$ columns and $2^p$ rows wherein each diode is in series with one of the contacts to be tested, each column is connected to one of a plurality of $2^n$ bus bars, each bus bar having one end connected via a load resistance to one pole of a battery whose other pole is grounded, and each row is grounded via row switching means;
    c. $2^m$ reading circuits each comprising a diode logic or-circuit having $2^{n-m}$ inputs and a single output, each of the $2^n$ bus bars being connected to only one of said reading circuit inputs the output of each logic or-circuit being connected to the base of a reading transistor said reading transistor connected to an amplifier for detecting whether the reading transistor is in the conductive or non-conductive state, each such state corresponding to one of the positions of the tested contact;
    d. an address counter having $2^{n+p-m}$ addresses; and
    e. decoding means connected to said address counter and comprising selector circuits having diode logic or-circuit elements, said elements having outputs grounded via a selecting transistor and inputs connected to said bus bars, said decoding means grounding every input but one of each of said reading circuits and said decoding means triggering only one of said row switching means into a conducting state.

* * * * *